United States Patent [19]

Takao

[11] Patent Number: 4,833,114

[45] Date of Patent: May 23, 1989

[54] PROCESS FOR PREPARING PALLADIUM CATALYST FOR PURIFYING WASTE GAS

[75] Inventor: Hiroshi Takao, Ichikawa, Japan

[73] Assignee: Tanaka Kikinzoku Kogyo K.K., Japan

[21] Appl. No.: 225,001

[22] Filed: Jul. 27, 1988

[30] Foreign Application Priority Data

Jan. 30, 1987 [JP] Japan .................................. 62-20093

[51] Int. Cl.$^4$ .............................................. B01J 23/44
[52] U.S. Cl. .................................... 502/333; 502/339
[58] Field of Search ................ 502/333, 339, 262, 185

[56] References Cited

U.S. PATENT DOCUMENTS 4,617,289 10/1986 Saito et al. ........................... 502/339

FOREIGN PATENT DOCUMENTS 7845 1/1988 Japan .................................. 502/333
62548 3/1988 Japan .................................. 502/333

*Primary Examiner*—Paul E. Konopka
*Attorney, Agent, or Firm*—Klauber & Jackson

[57] ABSTRACT

A process for preparing a palladium catalyst for purifying a waste gas is disclosed. The process comprises dissolving dinitrodiammine palladium in a nitric acid solution in the temperature range of 60° to 100° C., aging the solution, applying the solution on a carrier, and reducing the palladium compound on the carrier to prepare the palladium catalyst.

The catalyst prepared has the excellent catalytic performance because the nitric acid solution of the dinitrodiammine palladium is a completely uniform solution which can disperse the dinitrodiammine palladium uniformly on the carrier.

4 Claims, No Drawings

PROCESS FOR PREPARING PALLADIUM CATALYST FOR PURIFYING WASTE GAS

BACKGROUND OF INVENTION

This invention relates to a process for preparing a palladium catalyst for purifying a waste gas. More particularly, the invention relates to a process for preparing a palladium catalyst comprising palladium particles uniformly and finely dispersed and supported on a carrier such as activated alumina for purifying carbon monoxide, hydrocarbons and the like contained in the waste gas such as an automotive exhaust gas from the internal combustion engine of automobiles etc., a waste gas from an industrial plant and a waste gas from such an electric apparatus for domestic use as a cooking stove, by completely oxidizing them.

Heretofore, a palladium-supported catalyst has been widely utilized as that for purifying the automotive exhaust gas from automobiles and the waste gas from the industrial plant, and especially in recent years the palladium-supported catalyst with a minimum amount of palladium particles having excellent catalytic performance supported on activated alumina has been developed.

Dinitrodiammine palladium ($Pd(NH_3)_2(NO_2)_2$) is employed as one of the palladium sources for preparing the palladium catalyst. However, the dinitrodiammine palladium is fine powder which hardly dissolved in water or nitric acid at normal temperature. Accordingly, in order to increase the amount of the palladium metal deposited on the carrier, it is necessary to employ a suspended solution of colloidal palladium uniformly dispersed in water or nitric acid. If the suspended palladium is deposited on the carrier, it cannot be uniformly dispersed on the carrier so that the catalytic performance of the catalyst is insufficient.

SUMMARY OF INVENTION

The present invention has been made to overcome the said disadvantage of the prior art.

It is, therefore, an object of the present invention to provide a process for preparing a palladium catalyst for purifying a waste gas comprising palladium particles uniformly and finely supported on a carrier.

The process for preparing the palladium catalyst for purifying the waste gas according to the present invention is characterized in that after dinitrodiammine palladium is mixed and dissolved in a nitric acid solution in the temperature range of 60° to 100° C. and is aged, the solution which has been aged is applied onto a carrier and the palladium compound in the solution on the carrier is reduced.

DETAILED DESCRIPTION OF INVENTION

The reason the dinitrodiammine palladium added to the nitric acid is dissolved therein and the resulting aqueous solution is aged in the temperature range of 60° to 100° C. is then described in detail. When the present inventor tried to heat the dinitrodiammine palladium dispersed in the suspension to dissolve the dinitrodiammmine palladium therein, the inventor recognized that the dinitrodiammine palladium starts dissolving in the suspended solution at the temperature of 60° C., that is, the temperature at which the dissolution begins is 60° C.

If, however, the temperature exceeds 100° C., decomposition of the above compound occurs to precipitate a palladium compound in the solution. Therefore, the dissolution of the dinitrodiammine palladium is conveniently carried out in the range of 60° to 100° C.

The concentration of the nitric acid is preferably in the range of 250 to 450 g/l. If the concentration of the nitric acid is extremely high, for example, above 450 g/l, the dinitrodiammine palladium added thereto is made unstable to precipitate a palladium compound. Conversely, if the concentration of the nitric acid is too low, for example, below 250 g/l, the dinitrodiammine palladium powder which cannot be dissolved in the nitric acid remains in the nitric acid solution.

After the dinitrodiammine palladium is completely dissolved in the nitric acid solution, the solution is aged in the appropriate temperature range. During the aging, since the solution turns from pale yellow to reddish brown, and from reddish brown to thick reddish brown, the progress of the aging can be easily observed.

If in this aging the initial concentration of the dinitrodiammine palladium is not sufficiently high, the dispersed fine palladium particles are maldistributed to make the dispersion worse after it is supported on the carrier such as activated alumina, a metal support and a refractory so that the catalyst has the insufficient catalytic performance. On the other hand, if the initial concentration of the dinitrodiammine palladium is too high, the palladium particles supported and reduced on the carrier aggregate with each other to form giant molecules. Accordingly, the palladium concentration of the dinitrodiammine palladium containing solution is preferably in the range of 250 to 450 g/l, and is more preferably around 300 g/l calculated as palladium metal. The aging of the dinitrodiammine palladium solution can be sufficiently performed at an appropriate aging temperature, for example, at 80° C. for 9 to 15 hours.

The solution having been sufficiently aged is then diluted with a proper amount of water or nitric acid, an additive and the like depending on the quantity of the palladium metal. The diluted solution is applied to the carrier or the carrier is dipped in the diluted solution to support the dinitrodiammine palladium on the carrier. Then the dinitrodiammine palladium is reduced to the fine palladium powder by mean of hydrogen gas or any other appropriate reducing agent to prepare a palladium catalyst for purifying a waste gas. The reduction of the dinitrodiammine palladium on the carrier is not necessarily carried out before the catalyst is used. The dinitrodiammine palladium may be reduced in hydrogen flow after the catalyst is set in a waste gas treating apparatus.

According to the process of the present invention, the catalyst for purifying a waste gas having the supported palladium particles finely and uniformly dispersed which has the excellent initial activity in a low temperature region can be prepared. Therefore, the present invention provide the utilitarian effect.

The invention will now be described by an Example and a Comparative Example which are considered to be illustrative, and not limitative.

EXAMPLE 100 g of $Pd(NH_3)_2(NO_2)_2$ crystals were gradually added to 220 ml of a nitric acid aqueous solution which had been previously heated to 80° C. and of which concentration was 252 g/l so that the crystals were dissolved therein. The temperature of the solution was maintained at this temperature for 10 hours to prepare an aged nitric acid solution of the palladium compound. Activated alumina was then dipped in the solution, and the palladium compound in the aqueous solution on the carrier was reduced in a hydrogen gas flow at 150° C. to produce a catalyst for purifying a waste gas.

COMPARATIVE EXAMPLE 100 g of $Pd(NH_3)_2(NO_2)_2$ crystals were gradually added to 220 ml of a nitric acid aqueous solution. The crystals were tried to be dissolved therein at ordinary temperature, but the crystals were not completely dissolved in the nitric acid solution to provide a colloidal solution. The palladium catalyst was prepared employing this solution by the method described in Example.

The dispersion states of the palladium particles of the catalysts prepared according to the above Example and the Comparative Example were analyzed by means of a scanning type electron microscope. The palladium particles on the Example catalyst were uniformly and finely dispersed, while those on the Comparative Example catalyst were observed to be in the maldistributed dispersion state and further the aggregation of the particles was observed.

What is claimed is:

1. A process for preparing a palladium catalyst for purifying a waste gas which comprises dissolving dinitrodiammine palladium in a nitric acid solution in the temperature range of 60° to 100° C., aging the solution, applying the solution on a carrier, and reducing the palladium compound on the carrier to prepare the palladium catalyst.

2. The process as claimed in claim 1, wherein the aging is carried out in the temperature range of 60° to 100° C.

3. The process as claimed in claim 1, wherein the palladium concentration in the nitric acid solution as palladium metal is in the range of 250 to 450 g/l.

4. The process as claimed in claim 1, wherein the palladium compound on the carrier is reduced in hydrogen atmosphere.

* * * * *